US011916201B2

(12) United States Patent
Sala et al.

(10) Patent No.: US 11,916,201 B2
(45) Date of Patent: Feb. 27, 2024

(54) MOTION-GENERATING PARTICLES FOR DESULFATION OF LEAD-ACID BATTERIES

(71) Applicant: GM GLOBAL TECHNOLOGY OPERATIONS LLC, Detroit, MI (US)

(72) Inventors: Dorel M. Sala, Troy, MI (US); Mahmoud Abd Elhamid, Troy, MI (US); Dave G. Rich, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 17/119,824

(22) Filed: Dec. 11, 2020

(65) Prior Publication Data

US 2022/0190394 A1 Jun. 16, 2022

(51) Int. Cl.
| | | |
|---|---|---|
| *H01M 10/42* | (2006.01) | |
| *H01M 10/12* | (2006.01) | |
| *H01M 10/02* | (2006.01) | |
| *H01M 10/08* | (2006.01) | |

(52) U.S. Cl.
CPC ....... *H01M 10/4235* (2013.01); *H01M 10/02* (2013.01); *H01M 10/08* (2013.01); *H01M 10/12* (2013.01)

(58) Field of Classification Search
CPC .. H01M 10/4235; H01M 10/02; H01M 10/08; H01M 10/12
See application file for complete search history.

(56) References Cited

U.S. PATENT DOCUMENTS

| | | | |
|---|---|---|---|
| 4,308,322 A | 12/1981 | Hammar | |
| 4,565,748 A | 1/1986 | Dahl | |
| 5,869,200 A * | 2/1999 | Nunnally | B60L 50/72 |
| | | | 429/105 |
| 11,309,588 B1 | 4/2022 | Sala et al. | |

(Continued)

FOREIGN PATENT DOCUMENTS

| | | | | |
|---|---|---|---|---|
| CN | 101304099 A | * | 11/2008 | ............ H01M 10/12 |
| CN | 110797589 A | * | 2/2020 | ........ H01M 10/4235 |

(Continued)

OTHER PUBLICATIONS

English machine translation of Hou et al. (CN 110797589 A) (Year: 2020).*

(Continued)

*Primary Examiner* — Victoria H Lynch
(74) *Attorney, Agent, or Firm* — Harness, Dickey & Pierce, P.L.C.

(57) ABSTRACT

The present disclosure pertains to motion-generating particles for desulfation of lead-acid batteries, lead-acid batteries including such motion-generating particles, and methods of making and using the same. For example, the present disclosure provides a lead-acid battery including one or more electroactive plates disposed within a casing; an electrolyte disposed within the casing and surrounding the electroactive plates; a plurality of ferromagnetic particles disposed with the electrolyte within the casing; and one or more electromagnets. The one or more electromagnets may be configured to direct a magnetic field towards the electrolyte to selectively cause movement of the plurality of ferromagnetic particles so as to agitate the electrolyte.

9 Claims, 6 Drawing Sheets

(56) References Cited

U.S. PATENT DOCUMENTS

| | | | |
|---|---|---|---|
| 11,309,589 B1 | 4/2022 | Sala et al. | |
| 2012/0308867 A1 | 12/2012 | Winter | |
| 2013/0011702 A1 | 1/2013 | Horne et al. | |
| 2017/0306943 A1 | 10/2017 | Hays et al. | |

FOREIGN PATENT DOCUMENTS

| | | | | |
|---|---|---|---|---|
| CN | 114628796 A | | 6/2022 | |
| CN | 114628797 A | | 6/2022 | |
| CN | 114628798 A | | 6/2022 | |
| DE | 102021114607 A1 | | 6/2022 | |
| DE | 102021114608 A1 | | 6/2022 | |
| DE | 102021114609 A1 | | 6/2022 | |
| JP | 60054179 A | * | 3/1985 | ............ H01M 10/10 |
| JP | 2019071194 A | * | 5/2019 | |
| KR | 20170061465 A | * | 6/2017 | .......... H01M 10/052 |
| WO | WO-2004107369 A1 | * | 12/2004 | ............... F16J 15/43 |

OTHER PUBLICATIONS

English machine translation of Murakami (JPS 6054179A) (Year: 1985).*
English machine translation of Onodera et al. (JP 2019071194 A) (Year: 2019).*
English machine translation of Yoo et al. (KR 20170061465 A) (Year: 2017).*
Machine translation CN101304099A (Year: 2008).*

* cited by examiner

MOTION-GENERATING PARTICLES FOR DESULFATION OF LEAD-ACID BATTERIES

INTRODUCTION

This section provides background information related to the present disclosure which is not necessarily prior art.

The present disclosure pertains to energy storage devices, including devices and methods for desulfation of lead-acid batteries.

Lead-acid batteries are important sources of energy for a variety of applications, including, for example, various motor vehicles with start/stop function and micro-hybrid motor vehicles. Typical lead-acid batteries include pluralities of alternatively stacked negative and positive plates separated by ion-permeable separators disposed within a battery casing. The battery case contains one or more electrolytes, for example aqueous acid solutions including sulfuric acid. Each plate includes an electrically conductive frame or support (e.g., lead grid lattice) that supports an electroactive material, such as a battery paste comprising lead oxide or lead (e.g., sponge lead).

During battery discharge, electroactive materials react with the sulfuric acid to form lead sulfate. Lead sulfate typically forms in a finely divided, amorphous state (e.g., soft state) that readily reverts during battery recharge. However, as the battery cycles through numerous discharges and charges, in particular when the lead-acid battery is insufficiently charged for a long period of time, a portion of the lead sulfate may precipitate or crystallize on surfaces of the plates (e.g., hard state). The precipitation of the lead sulfate may cause an increase in internal resistance leading to performance deterioration of the battery and, in certain instances, plate cracking.

Common methods for desulfation, such as long duration and pseudorandom pulse charging, often require too much time to be effective and use voltages and frequencies that are incomparable with the use of the lead-acid battery. Other methods for desulfation, including the application and regulation of applied voltages and temperature, often exacerbate corrosion and gassing effects within the lead-acid battery. Accordingly, it would be desirable to develop improved materials and methods for the desulfation of lead-acid batteries.

SUMMARY

This section provides a general summary of the disclosure, and is not a comprehensive disclosure of its full scope or all of its features.

The present technology provides, in various aspects, devices (e.g. energy storage devices) comprising an electroactive structure (e.g., an electrode) and an electrically-conductive solution (e.g., an electrolyte) in fluid communication with a surface of the electroactive structure. In various embodiments, such devices are batteries, such as lead-acid batteries.

In various aspects, the device (e.g., a lead-acid battery) includes one or more electroactive plates disposed within a casing; an electrically-conductive solution (e.g., electrolyte) disposed within the casing and surrounding the electroactive plate(s); a plurality of particles disposed with the electrically-conductive solution within the casing, where each particle comprises a ferromagnetic material. The device further comprises one or more electromagnets configured to direct a magnetic field towards the electrically-conductive solution to selectively cause movement of the plurality of particles in the magnetic field so as to agitate the electrically-conductive solution. In various aspects, such movement may alter the concentration of ionic species in the electrically-conductive solution in proximity to a surface of the electroactive structure.

As referred herein, "surround" means contact of the electrolyte (or other reactive or electrically-conductive solution). In various embodiments, the electrolyte may substantially cover one or more surfaces of the electroactive plate. In some aspects, the electrolyte may cover substantially all surfaces of the electroactive plate.

In one aspect, the one or more electromagnets may be disposed on or adjacent to one or more surfaces of the casing.

In one aspect, the one or more electromagnets may be integrated into one or more surfaces defining the casing.

In one aspect, the lead-acid battery may include one or more cells and the casing may include one or more integrated walled partitions that define one or more cell compartments. In such instances, the one or more electromagnets may be integrated into the one or more integrated walled partitions.

In one aspect, each electromagnet from the plurality of the electromagnets generates a magnetic field strong enough that each and every particle can be attracted or repelled by the magnetic field.

In one aspect, each particle of the plurality of particles defines a shell of ferromagnetic material disposed around a core.

In one aspect, the core includes one or more gaseous materials selected from the group consisting of: H, He, N, air or light materials such as low-density polymeric foams, and combinations thereof.

In one aspect, exposed surfaces of each particle of the plurality of particles can coated with one or more protective coatings.

In various other aspects, the present disclosure provides a method for desulfation in a lead-acid battery. The method includes activating one or more electromagnets to direct a magnetic field towards one or more plurality of ferromagnetic particles disposed within an electrolyte in a casing defining the lead-acid battery so as to cause the plurality of ferromagnetic particles to move within the electrolyte.

In one aspect, the one or more electromagnets may be disposed on or adjacent to one or more surfaces of the casing.

In one aspect, the one or more electromagnets may be integrated into one or more surfaces defining the casing.

In one aspect, the lead-acid battery includes one or more cells and the casing includes one or more integrated walled partitions that define one or more cell compartments. In such instances, the one or more electromagnets can be integrated into the one or more integrated walled partitions.

In one aspect, each electromagnet from the plurality of the electromagnets generates a magnetic field strong enough to attract or repel each and every particle from inside the electrolyte.

In one aspect, each ferromagnetic particle of the plurality of ferromagnetic particles defines a shell of ferromagnetic material disposed around a central region.

In one aspect, the central region includes one or more gaseous materials selected from the group consisting of: H, He, N, air or light materials such as low-density polymeric foams, and combinations thereof.

In one aspect, exposed surfaces of each the ferromagnetic particle of the plurality of ferromagnetic particles may be coated with one or more protective coatings.

In one aspect, the motion of the particles can be controlled by sequential energizing the coils of the electromagnets in a predetermined order, in turn generating desired wave-like motion of the electrolyte.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
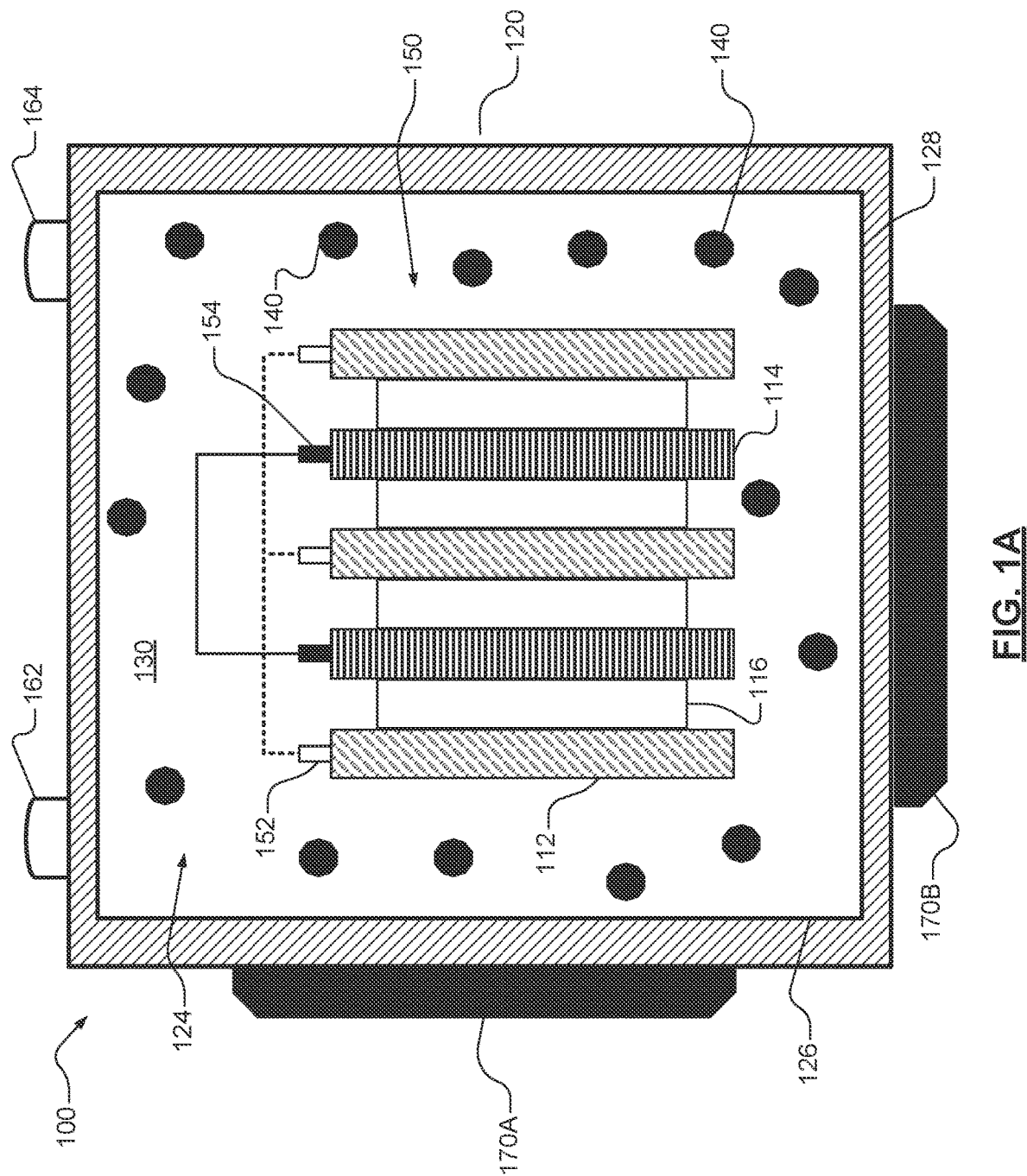
FIG. 1A is a schematic illustration of an example single cell lead-acid battery having motion-generating particles for the desulfation in accordance with various aspects of the present disclosure.

Example embodiments are provided so that this disclosure will be thorough, and will fully convey the scope to those who are skilled in the art. Numerous specific details are set forth, such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers, and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains generally to devices operable to create motion in fluids that are in fluid communication (contact) with a surface. In various aspects, the fluid and surface comprise species in a electrochemical reaction, and the devices are operable to alter local concentrations of the species so as to affect the equilibrium of the electrochemical reaction. Such motion may include stirring, agitation, circulation, or other flow of the fluid in contact with the surface (generally referred to "agitation" herein). In some embodiments, motion may increase the uniformity of concentration of chemical species in the solution, e.g., by homogenizing the distribution of species in the solution. Accordingly, in some embodiments, the present technology provides a device (e.g., a lead-acid battery) comprising: a casing having an interior surface; an active component having a surface (e.g., an electroactive plate) disposed in the casing; a fluid (e.g., electrolyte) disposed within the casing and surrounding the surface of the active component. The device further comprises: a plurality of particles disposed in the fluid within the casing, where each particle of the plurality of particles comprise a ferromagnetic material; and one or more electromagnets configured to direct a magnetic field towards the electrically-conductive solution to selectively cause movement of the plurality of particles so as to agitate the electrically-conductive solution.

For example, the present disclosure provides motion-generating mechanisms useful in electrochemical energy storage devices. In various embodiments, such devices are batteries comprising solutions (e.g., electrolytes) in fluid communication with reactive surfaces (e.g., electrodes). In some embodiments, such batteries are lead-acid batteries, such as flooded, sealed, absorbent glass mat (AGM), gel sealed, and bipolar lead-acid batteries.

As discussed above and further herein, such mechanisms may be internally disposed in lead-acid devices, and are operable to desulfate electrodes. For example, internally disposed motion-generating mechanisms create wave-like motions, for example directional, circular, and/or general-localized waves, so as to agitate an electrolyte within the lead-acid battery. Movement of the electrolyte may maintain, and in certain aspects increase, the solubility of lead sulfates which, thereby, facilitates removal from lead sulfates from the surfaces of lead-acid battery electrodes. A lead-acid battery including such motion-generating mechanisms may include, for example, one or more electroactive plates disposed within a casing; an electrolyte disposed within the casing and surrounding the electroactive plates; a plurality of particles disposed with the electrolyte within the casing, wherein the particles comprise a ferromagnetic material; and one or more electromagnets configured to cause movement of the plurality of particles so as to agitate the electrolyte.

A typical lead-acid battery comprises a plurality of alternatively stacked negative and positive plates separated by ion-permeable separators and/or electrolytes. Often, lead-acid batteries include a plurality of cells electrically connected, for example, in a stack or winding configuration, to increase overall output. A lead-acid battery may include a battery casing having a plurality of cell compartments where one or more cells are disposed. The cells may be electrically connected within and across the multiple compartments. Each separator includes an electrolyte that may, in certain aspects, also be present in the stacked plates, as well as filling at least a portion of a cavity or interior defined by the battery casing, including, in the instance of multi-cell batteries, segregated cell compartments defined by, for example, integrated walled partitions. Lead-acid batteries operate by a double sulfate chemical reaction. For example, lead and lead dioxide active materials on the batteries plates may react with sulfuric acid in the electrolyte.

For example, an exemplary and schematic illustration of a single cell lead-acid battery 100 is shown in FIG. 1A. Though a single cell lead-acid battery 100 is illustrated, the skilled artisan will appreciate that the present teachings also apply to various other lead-acid battery configurations, including, for example, lead-acid batteries having two or more individual or distinct electrochemical cells disposed within a single battery housing or casing, as well as battery casings having multiple compartments. The size and shape of a lead-acid battery, including, for example, the number of individual cells and/or compartments, as well as the number of plates defining a cell, may vary depending on the particular application for which it is designed. Battery-powered vehicles and hand-held consumer electronic devices, for example, are two examples where batteries would most likely be designed to different size, capacity, and power-output specifications. In certain variations, a 12V lead-acid battery may comprise six adjacent cells that are electrically connected in serial. The skilled artisan will also recognize that in various aspects lead-acid batteries may include, though not illustrated here, a variety of other components or materials. For instance, lead-acid batteries may include vents, gaskets, and any other conventional component or material.

With renewed reference to FIG. 1A, the illustrated battery 100 includes a plurality of positive plates 112 and a plurality of negative plates 114. The positive and negative plates 112, 114 are in electrical communication and arranged in an alternating stack 150 within a battery housing or casing 120. The battery 100 further includes a plurality of separators 116 that are disposed between the alternating plates 112, 114, also within the battery casing 120. Though the battery casing 120 is illustrated as a singular component, the skilled artisan will appreciate that in various aspects, the battery casing 120 may comprise an opened container having a lid or cover component. In various aspects, the casing 120 is formed from a moldable plastic material comprising, for example, one or more polycarbonates.

The separators 116 provide electrical separation (e.g., prevents physical contact) between the stacked plates 112, 114. The separators 116 also provide a minimal resistance path for internal passage of ions between the plates 112, 114 during battery cycling. The skilled will appreciate that in various aspect separators 116 may be the same or different across the battery 100. For example, in certain aspects, by way of non-limiting example, each separator 116 may be a microporous polymeric separator including, for example, a polyolefin. Each separator 116 may also include one or more known wetting agents and/or ionic-conductivity enhancers.

In various aspects, the positive and negative plates 112, 114 comprise electrically conductive frames or supports that support one or more active materials. For example, as illustrated in FIG. 1B, each positive plate 112 includes a first electrically conductive frame 200 and a first or positive active material 202 disposed thereon. The first electrically conductive frame 200 may be a grid lattice having, for example, a honeycomb structure. As illustrated, the first electrically conductive frame 200 may include a first or positive tab 152. As seen in FIG. 1A, the first tabs 152 of the plurality of positive plates 112 may be electrically connected, and in various aspects, though not shown, the first tabs 152 of the positive plates 112 may be in electrical communication with a first or positive battery terminal 162.

In various aspects, the first electrically conductive frame 200 comprises lead (Pb), and in certain aspects, a lead alloy further comprising one or more additive materials. For example, the first electrically conductive frame 200 may include one or more of antimony (Sb), calcium (Ca), tin (Sn), aluminum (Al), and titanium (Ti). Such additive materials may provide additional mechanical strength to the first electrically conductive frame 200. In various other instances, by way of non-limiting example, the first electrically conductive frame 200 may be formed instead from a silicon wafer having a silicide coating. In still further variations, the first electrically conductive frame 200 may include one or more carbonaceous materials, for example, as a coating.

The first active material 202 that is supported by the first electrically conductive frame 200 may be in the form of a paste including, for example, a first electroactive material comprising, for example, lead oxide ($PbO_2$), as well as sulfuric acid and water. In various aspects, the first electroactive material may further include one or more first additives, for example, a carbon additive, a silicon additive, and/or a sulfate additive. For example, carbon additives may improve charge acceptance of the first electroactive material, while silicon additives provide for lighter weight systems and improves chemical stability and sulfate additives provides protection against water loss, as well as over-voltage and over-temperature immunity.

Figure 1C:
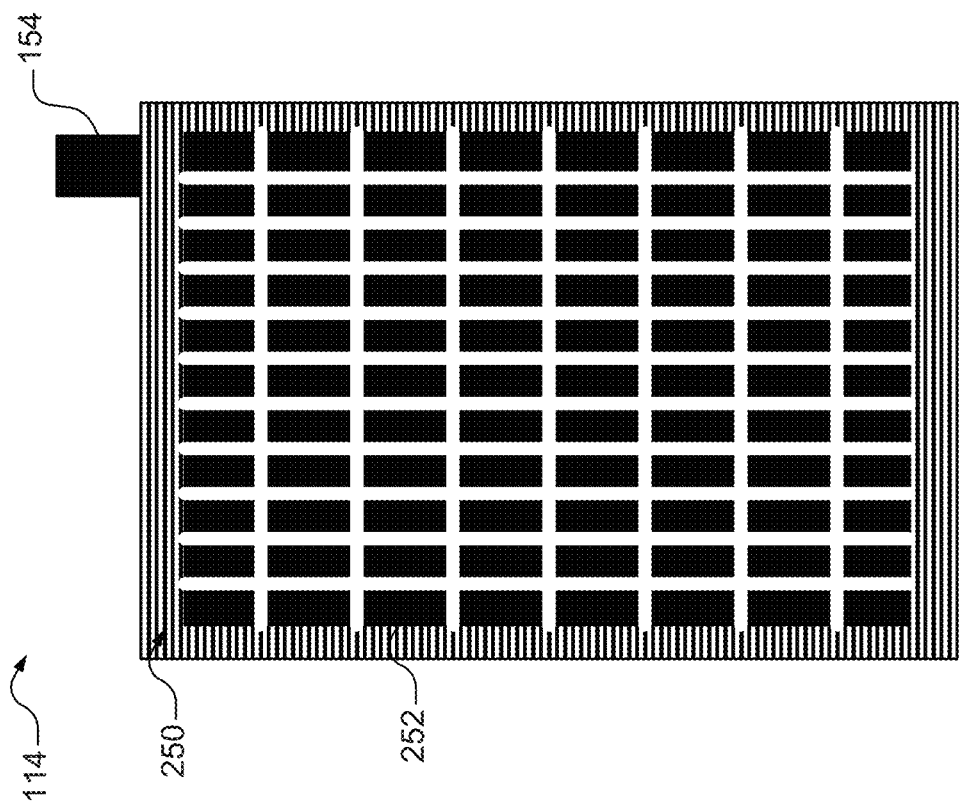
FIG. 1C is a schematic illustration of another example plate for a lead-acid battery.
Figure 1B:
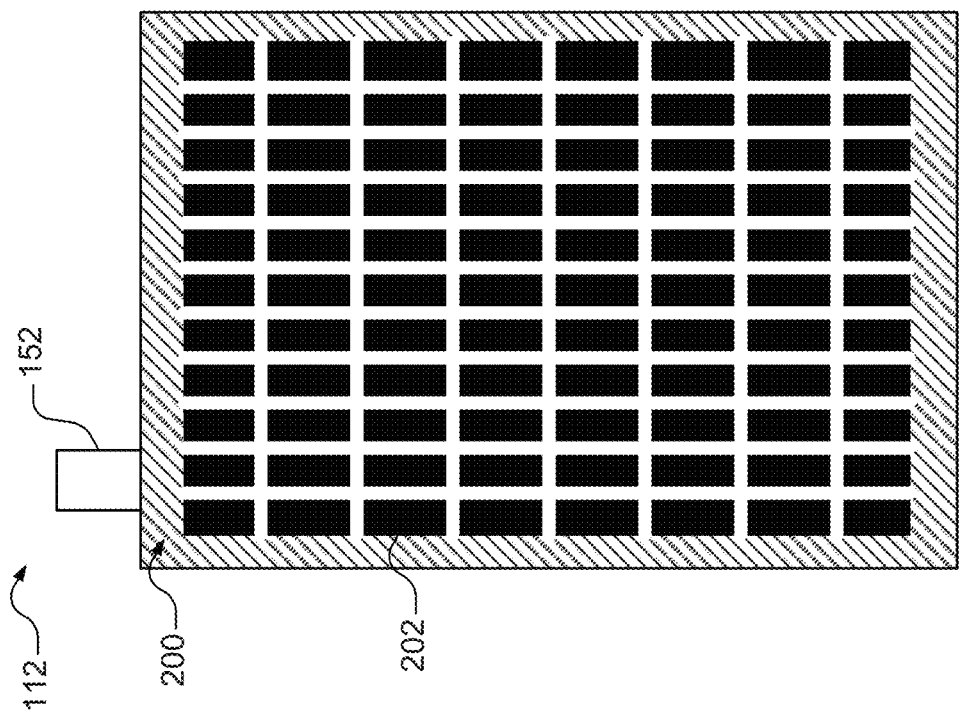
FIG. 1B is a schematic illustration of an example plate for a lead-acid battery.

As illustrated in FIG. 1C, each negative plate 114 includes a second electrically conductive frame 250 and a second or negative active material 252 disposed thereon. Like the first electrically conductive frame 200, the second electrically conductive frame 250, may be a grid lattice having, for example, a honey-comb structure. As illustrated, the second electrically conductive frames 250 may each include a second or negative tab 154. As seen in FIG. 1A, the second tabs 154 of each of the plurality of negative plates 114 may be electrically connected, and in various aspects, though not shown, the second tab 154 of each of the plurality of negative plates 114 may be in electrical communication with a second or negative battery terminal 164.

The second electrically conductive frame 250 may be the same or different from the first electrically conductive frame 200. For example, the second electrically conductive frame 250 may comprise lead (Pb), and in certain aspects, a lead alloy further comprising one or more additive materials. For example, the second electrical conductive frame 250 may include one or more of antimony (Sb), calcium (Ca), tin (Sn), aluminum (Al), and titanium (Ti). Such additive materials may provide additional mechanical strength to the second electrically conductive frame 250.

The second active material 252 supported by the second electrically conductive frame 250 may be in the form of a paste including, for example, a second electroactive material comprising one or more of, for example, lead (Pb) and lead oxide ($PbO_2$), as well as sulfuric acid and water. In various aspects, like the first electroactive material, the second electroactive material may further include one or more second additives, for example, a carbon additive, a silicon additive, and/or a sulfate additive.

As noted above, the separators 116, as well as the pluralities of stacked plates 112, 114 and the cavity or interior 124, defined by the battery casing 120, includes an electrolyte 130. The electrolyte 130 is an aqueous acid solution comprising, for example, sulfuric acid ($H_2SO_4$) prior to battery formation. In certain variations, the electrolyte 130 may include one or more known electrolyte additives.

The lead-acid battery 100 may generate an electric current during discharge by way of reversible electrochemical reactions. For example, the lead-acid battery 100 may operate by a double sulfate chemical reaction. The sulfuric acid present in the electrolyte 130 may react with both the first and second active materials 202, 252 to form lead sulfate ($PbSO_4$). The battery 100 can be charged or re-energized at any time by connecting an external power source to the battery 100, for example to the battery terminals 162, 164, to reverse the electrochemical reactions that occur during battery discharge. The external power source that may be used to charge the battery 100 may vary depending on the size, construction, and particular end-use of the battery 100. Some notable and exemplary external power sources include, but are not limited to, an AC-DC converter connected to an AC electrical power grid though a wall outlet and a motor vehicle alternator.

During discharge, lead sulfate typically forms in a finely divided, amorphous state (e.g., soft state) that readily reverts during battery recharge. However, as the lead-acid battery 100 cycles through numerous discharges and charges, in particular when the lead-acid battery 100 is insufficiently charged for a long period of time, a portion of the lead sulfate may precipitate or crystallize on surfaces of the plates (e.g., hard state). In various aspects, the present disclosure provides low-power motion mechanisms that agitate or disturb the electrolyte 130 so as to inhibit, and in certain aspects reverse, sulfation and electrolyte stratification in the lead-acid battery 100. For example, with renewed reference to FIG. 1A, in various aspects, the lead-acid battery 100 may include a plurality of particles 140. The particles 140 may be disposed within the interior 124 of the casing 120, along with the electrolyte 130. In certain aspects, the particles 140 may occupy greater than or equal to about 5 vol. % to less than or equal to about 10 vol. % of the interior 124. The particles 140 may be magnetic particles that are configured to agitate the electrolyte 130, for example, using low-power magnetic suspension motion. The average dimension of the particle can vary from microns to millimeters.

Figure 1D:
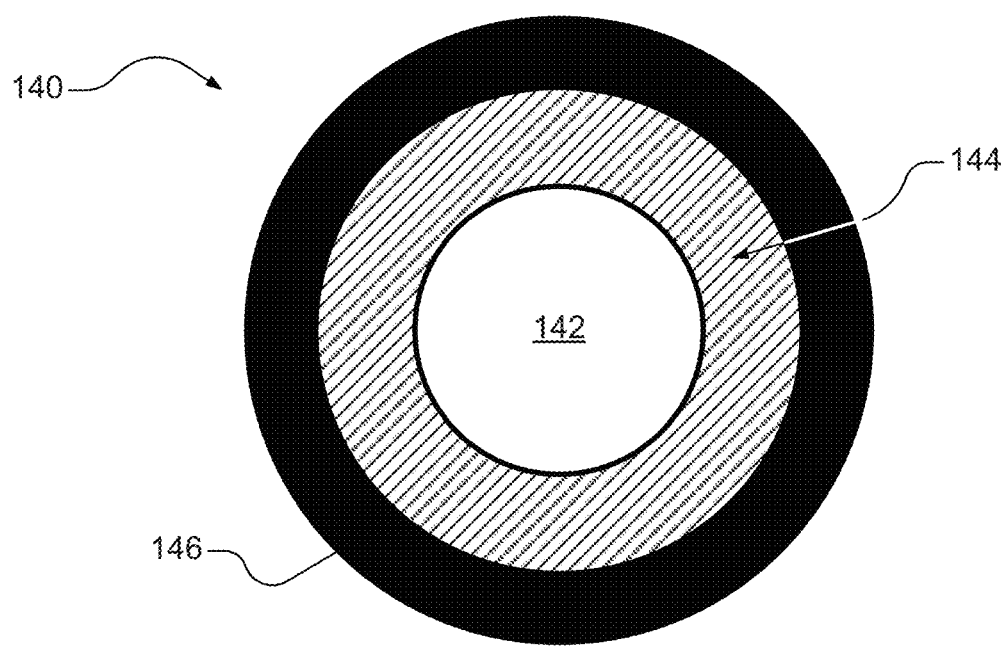
FIG. 1D is a schematic illustration of an example motion-generating particle in accordance with various aspects of the present disclosure.

As illustrated in FIG. 1D, the particles 140 may each have a core or central region 142 that is defined by a plurality of layers 144, 146. For example, a first or interior layer 144 comprises a ferromagnetic material. For example, in various aspects, the interior layer 144 may comprise one or more ferromagnetic materials, for example, such as iron (Fe) and/or iron alloys. A second or exterior layer 146 may cover or coat the exterior-facing surface of the first layer 144. As illustrated, the second layer 146 may substantially cover the entire exterior-facing surface of the first layer 144. The second layer 146 may be a protective layer comprising, for example, polytetrafluoroethylene. In various aspects, the core 142 may include one or more gaseous materials or low-density polymeric foams. For example, the core 142 may include, for example only, helium (He), nitrogen (N), air gasses or polystyrene, polyimide foams. Such gaseous materials and light density materials provide improve versatility in movement or motion of the particles 140.

Figure 2:
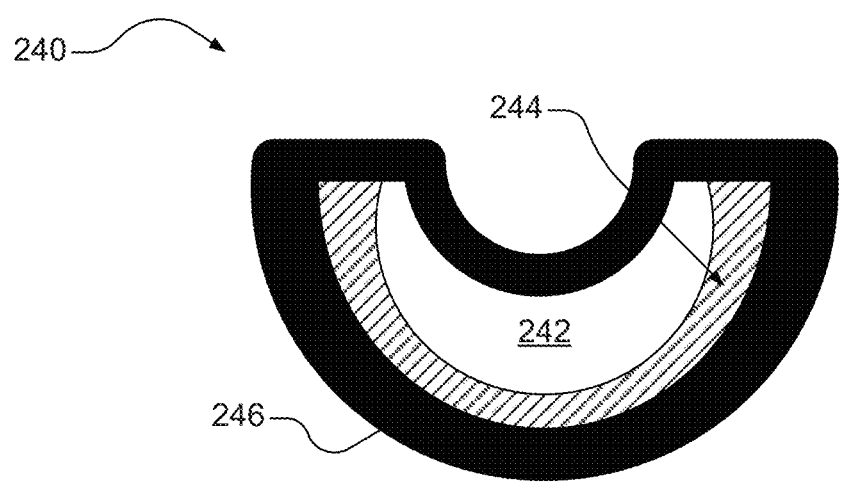
FIG. 2 is a schematic illustration of example motion-generating particles in accordance with various aspects of the present disclosure.

Though the illustrated particles 140 have substantially circular shapes, the skilled artisan will appreciate that in various instances the lead-acid battery 100 may include particles having various other shapes and configurations that would help to increase the volume of electrolyte solution that can be displaced by their motion. For example, as illustrated in FIG. 2, in certain variations, particles 340 may have a horseshoe shape. Similar to particle 140 illustrated in FIGS. 1A and 1D, particle 240 may include a portion 242, a first or interior portion 244, and a protective coating 246. The portion 242 may include one or more gaseous materials or low density materials. For example, the core 242 may include helium (He), nitrogen (N), air. The interior portion 244 may include one or more ferromagnetic materials, for example, such as iron (Fe) and/or iron alloys. The protective coating 246 may comprise, for example, polytetrafluoroethylene or polychlorotrifluoroethylene.

With renewed reference to FIG. 1A, the lead-acid battery 100 includes one or more electromagnets 170A, 170B. For example, as illustrated, the lead-acid battery 100 may include a first and second electromagnets 170A, 170B. The first electromagnet 170A may be disposed along a first side 126 of the casing 120. The second electromagnet 170B may be disposed along a second side 128 of the casing 120. Though only two electromagnets 170 are shown, the skilled artisan will appreciate that, in various other variations, the lead-acid battery 100 may include a single electromagnet 170 and/or additional electromagnets 170. The one or more electromagnets 170A, 170B may be configured to direct a magnetic field towards the electrolyte to selectively cause movement of the plurality of particles 140.

The one or more electromagnets 170A, 170B may be in electrical communication with the battery terminals 162, 164, for example using a voltage inverter circuit. In the instance of automotive vehicles, the controller circuit of the electromagnets may be in electrical communication with the vehicle electrical system and/or sensing circuit using, for example, a feedback system. The one or more electromagnets 170 direct movement of the interiorly disposed particles 140. For example, the one or more electromagnets 170A, 170B may be energized in predetermined sequences by the controller so as to drive movement of the particles 140 comprising, for example, one or more ferromagnetic materials. Movement of the particles 140 may create mechanical motion, for example wave-like motions, that disturb the electrolyte 130, which is also disposed in the interior 124.

For example, movement or motion of the particles 140 may circulate the electrolyte 130 so as to substantially prevent settling (e.g., improve solubility) of the lead sulfate, and in certain aspects, may maintain improved homogeneity in the electrolyte 130.

Figure 3:
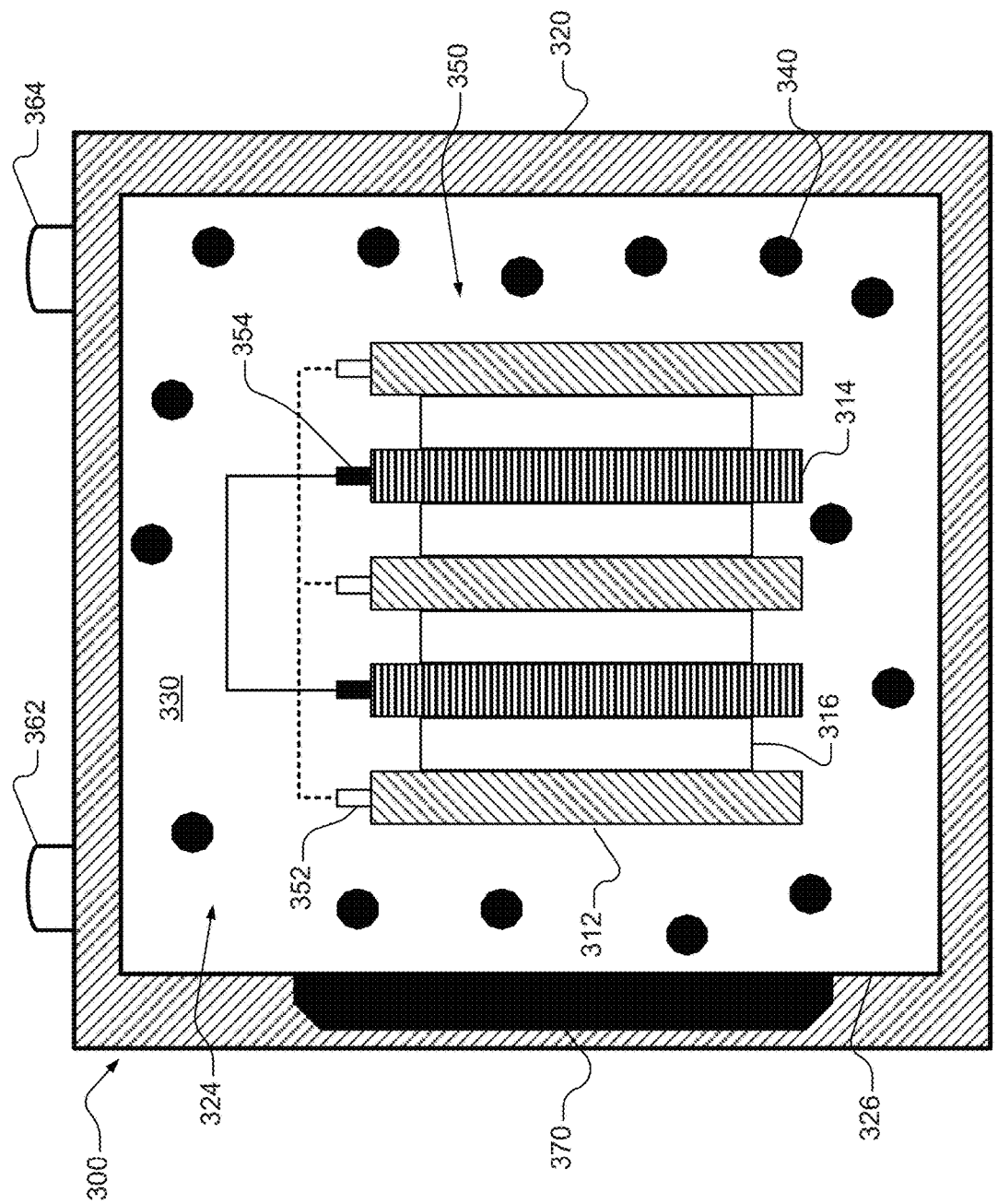
FIG. 3 is a schematic illustration of another example single cell lead-acid battery having motion-generating particles for the desulfation in accordance with various aspects of the present disclosure.

In various aspects, for example, as illustrated in FIG. 3, the one or more electromagnets 370 may be integrated into the one or more walls or surfaces 326 defining the battery casing 320. Lead-acid battery 300, similar to lead-acid battery 100 illustrated in FIG. 1A, includes a plurality of positive plates 312 and a plurality of negative plates 314. The positive and negative plates 312, 314 are in electrical communication and arranged in an alternating stack 350 within a battery housing or casing 320. The positive and negative plates 312, 314 may also be in electrical communication with one or more battery terminals 362, 364. The battery 300 further includes a plurality of separators 316 that are disposed between the alternating plates 312, 314, also within the battery casing 320. The separators 316, as well as the pluralities of stacked plates 312, 314 and the cavity or interior 324 defined by the battery casing 320, include an electrolyte 330. A plurality of particles 340 are disposed with the electrolyte 330 within the interior 324 of the battery casing 320.

The skilled artisan will appreciate that in various aspects one or more electromagnets, such as, for example, electromagnets 170 illustrated in FIG. 1A, and/or electromagnets 370 illustrated in FIG. 3, may have a variety of other configurations. For example, one or more electromagnets may be disposed on or integrated into the same, another, and/or additional sides or surfaces of a battery casing, such as for example, battery casing 120 illustrated in FIG. 1A and/or battery casing 320 illustrated in FIG. 3. Further, in the instance of multi-celled batteries including, for example, battery casings having multiple compartments, in certain variations, each cell or compartment may comprise one or more electromagnets. In other variations, a single electromagnet may extend across one or more cells or compartments. In still other variations, one or more electromagnets may be disposed on or integrated into one or more of the integrated walled partitions that define the individual cells or compartments. In such instances, the one or more electromagnets may include one or more electrical connections that extend from the one or more electromagnets and, for example, outside of the cell and/or battery casing.

As discussed above, the present technology provides methods for creating a flow of fluid containing reactive species in contact with a surface of an active component. In various embodiments, the surface of the active component comprises reactive species (e.g., ionic species) in an electrochemical reaction with reactive species in the fluid. In various aspects, the electrochemical reaction results in concentrations of the reactive species in the fluid that may differ depending on proximity to the surface of the active component. Thus, concentration of species in the fluid are not homogenous, such that the local concentration of species in the fluid at or near the surface of the active component may be higher or lower than the concentration of species at locations farther from the surface of the active component. In various aspects, methods of the present technology create flow in the fluid to alter the local concentration of reactive species which may, in some embodiments, operate to homogenize the concentration of the reactive species in the fluid.

In embodiments where the active component is an electrode in a battery, and the fluid is an electrolyte, methods mix the electrolyte in contact with a surface of the electrode, such as to alter the local concentration of ionic species at the surface of the electrode. For example, by altering the local electrolyte concentration, such methods may lower the concentration of reaction by products at the surface of the electrode. In some aspects, such methods may improve charge acceptance at a positive electrode. As discussed above, in various aspects such methods may reduce deposition of sulfate or aid in removal of sulfate deposits on electrodes in lead-acid batteries.

In various aspects, the present disclosure provides a method for desulfation in a lead-acid battery, for example the lead-acid battery 100 as illustrated in FIG. 1A and/or the lead-acid battery 300 as illustrated in FIG. 3. The method includes, for example, activating or mobilizing a plurality of particles disposed within an electrolyte. Movement of the plurality of particles may agitate the electrolyte. In various aspects, the lead-acid battery may include a control module that receives information, and, in certain instances, stores information, regarding the agitation of the electrolyte, and in certain instances, also the state of charge of the lead-acid battery. For example, the control module may include a central processing unit that is in communication with one or more electromagnets, for example electromagnets 170 as illustrated in FIG. 1 and/or electromagnet 370 illustrated in FIG. 3, so as to direct a magnetic field towards the electrolyte, for example electrolyte 130 illustrated in FIG. 1 and/or electrolyte 330 illustrated in FIG. 3, to selectively cause movement of the particles disposed therewith.

Figure 4:
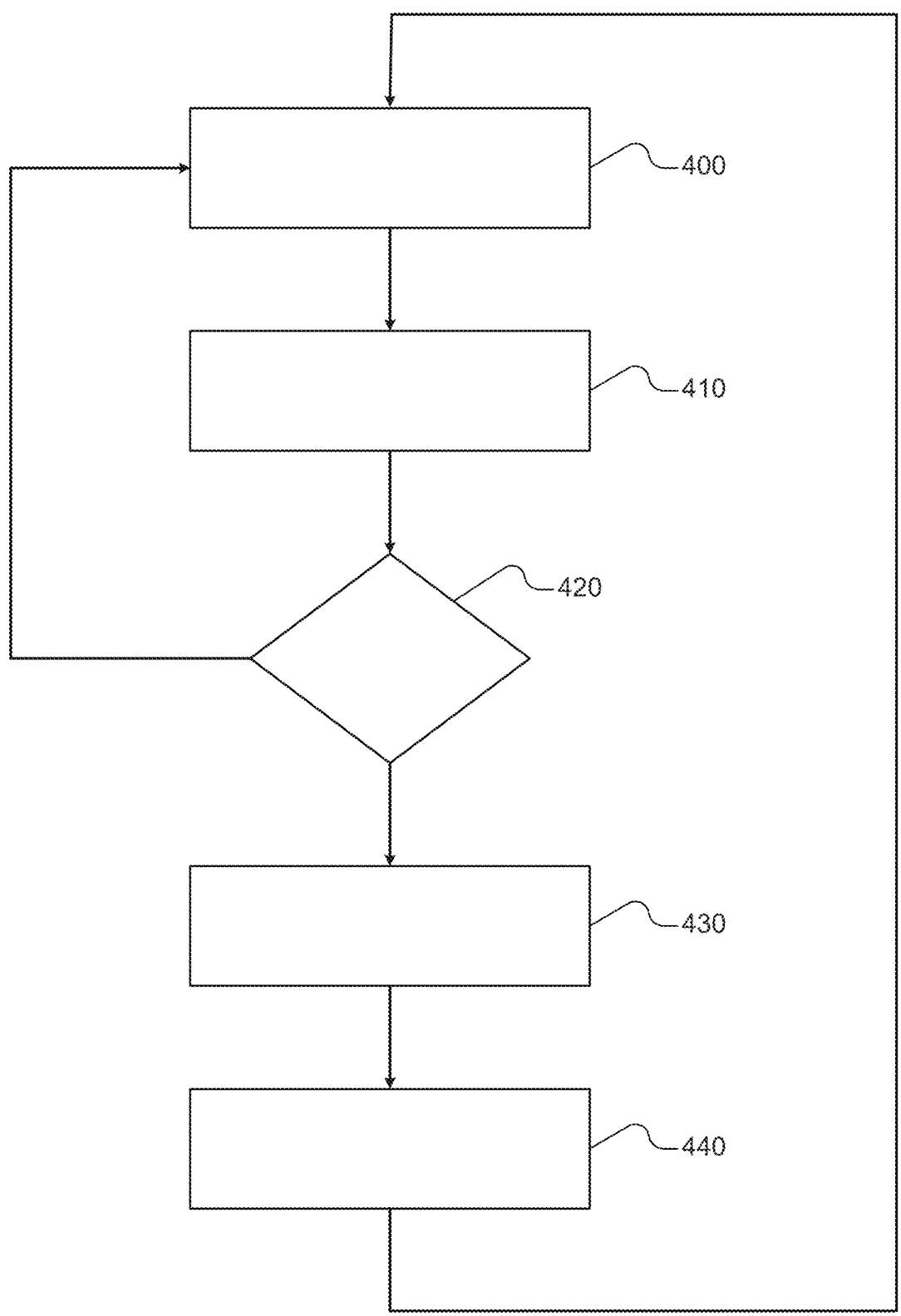
FIG. 4 is an illustration of an example control path for the motion-generating mechanisms illustrated in FIG. 1A and FIG. 3.

The control module may be configured to receive information regarding a last circulation and/or the current state of charge (SOC) and/or temperature—for example, information regarding the time of or since last motion and/or information regarding the current state of charge (SOC) and/or temperature of the system. If a time elapse since the last activation and/or the current state of charge (SOC) and/or temperature is different from (for example, greater than) a predetermined value the control module may again activate the one or more circulating systems and circulation of the electrolyte. The control module may also be configured to reset a timer, for example an internal timer. In various aspects, the internal timer may determine the frequency of control and, in certain instances, may define the time elapse since prior activation. The control module may be configured to circulate the electrolyte by movement of the one or more circulating systems for a predetermined number of cycles of the one or more circulating systems and/or for a predetermined time period. If, instead, the time elapse and/or current state of charge (SOC) and/or temperature is otherwise different from (for example, less than) the predetermined value the control module may maintain a neutral or non-motion state until the time elapse and/or current state of charge (SOC) and/or temperature is again different from (for example, greater than) the predetermined value. For example, FIG. 4 illustrates an example control path.

At method step 400, the control module may receive information regarding the time elapse since the last activation and/or the current state of charge (SOC) and/or temperature of the system. For example, the control module may be configured to determine the time elapse since the last activation using an internal timer. The control module may also be configured to receive information regarding the current state of charge (SOC) and/or temperature of the system, for example, from one or sensors in communication with the fluid (e.g., electrolyte) and/or energy system (e.g., lead-acid battery). In certain instances, the one or more sensors may also measure flow (e.g., velocity of motion) and the control module may be further configured to receive such information. Similarly, the one or more sensors may also determine the number of cycles elapsed and the control module may be further configured to receive such information.

At method step 410, the control module may be configured to calculate the time elapse since the last activation, the current state of charge (SOC) and/or temperature of the system, the velocity of motion, and/or the number of cycles using the received information. For example, the control module may be configured to determine an activation function that is a function of one or more of the time elapse since the last activation, the current state of charge (SOC) and/or temperature of the system, the velocity of motion, and/or the number of cycles.

At method step 420, the control module may be configured to compare the received and calculated information to one or more predetermined values. If the interested predetermined value or one or more predetermined value is satisfied, the control module may be configured to continue to method step 430. If the interested predetermined value or one or more predetermined value is not satisfied, the control module may be configured to return to method step 400.

At method step 430, the control module may be configured to activate the one or more circulating systems. The control module may be configured to activate the one or more circulating system for a predetermined number of cycles and/or a predetermined time period. Following the predetermined number of cycles and/or a predetermined time period, the control module may be configured, at method step 440, to reset and/or start an internal timer. The internal timer the internal timer may determine the frequency of control and, in certain instances, may define the time elapse since prior activation. After resetting and/or starting the internal timer at method step 440, the control module may be configured to return or start again at method step 400.

In some embodiments, methods of the present technology additionally comprise methods among those known in the art for reducing the formation of sulfate deposits or removing sulfate deposits from electrodes of lead-acid batteries. Such methods may include providing overcharge current to a battery, or application of pulse currents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lead-acid battery comprising:
    a battery casing comprising and enclosing two or more cell compartments, the two or more cell compartments defined by one or more integrated walled partitions disposed within the battery casing, each cell compartment comprising
    one or more electroactive plates;
    an electrolyte disposed surrounding the one or more electroactive plates; and
    a plurality of particles disposed with the electrolyte within the battery casing, at least a portion of the plurality of particles having a horseshoe shape and each particle of the plurality of particles comprising a shell of ferromagnetic material at least partially disposed around a core comprising a polymeric foam;

one or more first electromagnets fully encased in one or more surfaces of the battery casing; and one or more second electromagnets fully encased in the one or more integrated walled partitions, the one or more first electromagnets and the one or more second electromagnets each being configured to direct a magnetic field towards the electrolyte to selectively cause movement of the plurality of particles in the direction of the magnetic field so as to agitate the electrolyte.

2. The lead-acid battery of claim 1, wherein each electromagnet of the one or more first electromagnets and of the one or more second electromagnets generates a magnetic field strong enough that each and every particle will be attracted or repelled by the magnetic field.

3. The lead-acid battery of claim 1, wherein the polymeric foam comprises a low-density polymeric foam.

4. The lead-acid battery of claim 1, wherein exposed surfaces of each particle of the plurality of particles are coated with one or more protective coatings.

5. A method for desulfation in a lead-acid battery, the method comprising:

activating one or more first electromagnets and one or more second electromagnets to direct a magnetic field towards a plurality of ferromagnetic particles disposed within an electrolyte in a battery casing defining the lead-acid battery so as to cause the plurality of ferromagnetic particles to move within the electrolyte, at least a portion of the plurality of ferromagnetic particles having a horseshoe shape and each ferromagnetic particle of the plurality of ferromagnetic particles comprising a shell of ferromagnetic material at least partially disposed around a central region comprising a polymeric foam, the one or more first electromagnets being fully encased in the battery casing, the battery casing comprising and enclosing two or more cell compartments, the two or more cell compartments defined by one or more integrated walled partitions disposed within the battery casing, and the one or more second electromagnets fully encased in the one or more integrated walled partitions.

6. The method of claim 5, wherein each of the one or more first electromagnets and the one or more second electromagnets generates a magnetic field strong enough to attract or repel each and every ferromagnetic particle from inside the electrolyte.

7. The method of claim 5, wherein the polymeric foam comprises a low-density polymeric foam.

8. The method of claim 5, wherein exposed surfaces of each ferromagnetic particle of the plurality of ferromagnetic particles are coated with one or more protective coatings.

9. The method of claim 5, wherein motion of the plurality of ferromagnetic particles is controlled by sequential energizing one or more coils of each of the one or more first electromagnets and the one or more second electromagnets in a predetermined order, in turn generating desired wave-like motion of the electrolyte.

* * * * *